United States Patent [19]
James

[11] Patent Number: 5,901,450
[45] Date of Patent: May 11, 1999

[54] RIP GUIDE FOR A CIRCULAR SAW

[75] Inventor: Thomas Paul James, Oconomowoc, Wis.

[73] Assignee: Milwaukee Electric Tool Corporation, Brookfield, Wis.

[21] Appl. No.: 08/976,150

[22] Filed: Nov. 21, 1997

[51] Int. Cl.⁶ .......................... B23D 47/02; B23D 45/16; B23B 29/00
[52] U.S. Cl. .................................. 30/373; 30/371; 30/391
[58] Field of Search .............................. 30/373, 374, 371, 30/375, 391, 376, 377; 83/821, 829

[56] References Cited

U.S. PATENT DOCUMENTS

| | | | |
|---|---|---|---|
| 2,800,933 | 7/1957 | Michael | 143/43 |
| 2,819,742 | 1/1958 | Blachly | 30/373 X |
| 3,344,824 | 10/1967 | Greco | 143/160 |
| 4,397,089 | 8/1983 | Pease | 30/373 |
| 4,483,071 | 11/1984 | Te Kolste | 30/376 |
| 4,777,726 | 10/1988 | Flowers | 30/374 |
| 4,852,257 | 8/1989 | Moore | 30/373 |
| 4,971,122 | 11/1990 | Sato et al. | 30/374 X |
| 5,007,173 | 4/1991 | Rush | 30/391 |
| 5,035,061 | 7/1991 | Bradbury et al. | 33/430 |
| 5,046,255 | 9/1991 | Lebreux | 30/391 X |
| 5,084,977 | 2/1992 | Perkins | 30/374 |
| 5,103,566 | 4/1992 | Stebe | 33/42 |
| 5,121,545 | 6/1992 | Nonaka et al. | 30/376 |
| 5,440,815 | 8/1995 | Inkster | 30/390 |
| 5,517,763 | 5/1996 | Schilling et al. | 30/376 |
| 5,561,907 | 10/1996 | Campbell et al. | 30/371 |

FOREIGN PATENT DOCUMENTS

| 2011834 | 7/1979 | United Kingdom | 30/373 |
|---|---|---|---|

Primary Examiner—Rinaldi I. Rada
Assistant Examiner—John C. Wegand
Attorney, Agent, or Firm—Michael Best & Friedrich

[57] ABSTRACT

A rip guide for a circular saw. The circular saw includes a housing including a shoe plate for supporting the circular saw on a workpiece. The circular saw also includes a motor supported by the housing and a saw blade rotatably driven by the motor about an axis. The saw blade is operable to cut the workpiece in a cutting direction. The guide comprises a support member supported on the housing; an arm supported by the support member and extending from the housing in the cutting direction; and a guide member supported by the arm so that the guide member is pivotally supported by the support member. The guide member extends from the housing in the cutting direction. The guide member includes first and second guide surfaces for selectively guiding the circular saw relative to first and second edges, respectively, of the workpiece. The guide member is pivotable between a working position and a stored position. As the saw blade cuts the workpiece with the guide member in the working position, the guide member does not cause the saw blade to bind on the workpiece and does not obscure the operator's vision of the saw blade.

22 Claims, 2 Drawing Sheets

RIP GUIDE FOR A CIRCULAR SAW

BACKGROUND OF THE INVENTION

This invention relates to circular saws and, more particularly, to a rip guide for a circular saw.

A typical rip guide for a circular saw is disclosed in U.S. Pat. No. 2,800,933. The rip guide includes an elongated, straight guide plate connected to a support member shaft. The shaft is supported on the base plate of the circular saw and extends over the lateral edge of the base plate so that the guide plate extends parallel to the lateral edge of the base plate and along a portion of the saw blade. The guide plate is rotatable between a working position in which it is disposed below the plane of the base plate of the circular saw so as to be located for functioning as a rip guide, and a non-working position, in which the guide plate is disposed wholly above the plane of the base plate so that the guide plate does not interfere with the travel of the circular saw across a workpiece.

SUMMARY OF THE INVENTION

One problem with the above-described rip guide is that, in the working position, the guide plate extends along a portion of the saw blade. As the saw blade cuts the workpiece, the portion of the workpiece which has been cut is frequently wedged between the surface of the guide plate and the saw blade so that the saw blade binds on the workpiece.

Another problem with the above-described rip guide is that, because the support member shaft extends over the lateral edge of the base plate along the edge of the base plate, the guide plate may obscure the operator's vision of the saw blade as it cuts the workpiece. Similarly, when the guide plate is rotated above the plane of the base plate, the guide plate also may obscure the operator's vision of the saw blade as it cuts the workpiece.

Another problem with the above-described rip guide is that, because the support member shaft extends over the lateral edge or side of the base plate, the guide plate cannot be adjusted to all positions between the lateral edges of the base plate. Thus, a substantial "dead zone" of several inches of width exists between the lateral edges of the base plate.

Another problem with the above-described rip guide is that, because the guide plate extends along a portion of the saw blade, the guide plate cannot be positioned very close to the saw blade, as is required to cut only a narrow portion from the workpiece. In such proximity, the guide plate can be damaged by the saw blade. This is a substantial problem because one of the primary reasons for using a guide is to cut or shave only a narrow portion from a workpiece, such as a counter top.

Another problem with the above-described rip guide is that, because the guide plate extends off the lateral edge of the base plate of the circular saw, the rip guide can make the circular saw unwieldy or unbalanced.

Another problem with the above-described rip guide is that, when the rip guide is mounted on the circular saw, the guide plate can hinder removal of the saw blade.

The present invention provides a rip guide for a circular saw that overcomes the problems of prior art rip guides. The invention provides a guide for guiding the circular saw relative to an edge of the workpiece in a cutting direction. The guide includes a support member supported by the housing and, preferably, by the shoe plate of the circular saw. The support member is supported adjacent the forward portion of the shoe plate.

The guide also includes an arm supported by the support member and extending from the housing in the cutting direction. The guide also includes a guide member supported by the arm. The guide member extends from the housing in the cutting direction. The guide member has a first guide surface for guiding along a first edge of the workpiece in the cutting direction. The first guide surface is parallel to a lateral side edge of the shoe plate. The guide member may further include a second guide surface spaced from and facing opposite to the first guide surface.

The guide member is adjustable so that the first guide surface is engageable with the first edge of the workpiece on one side of the saw blade or so that the second guide surface is engageable with a second edge of the workpiece on the other side of the saw blade. In addition, the rip guide is adjustable so that the first and second guide surfaces are positionable at a plurality of lateral positions relative to the saw blade.

Further, the guide member may be pivotally supported by the support member for movement between a working position, in which one of the first and second guide surfaces is engageable with the corresponding first or second edge of the workpiece, and a stored position, in which the guide is not engageable with the workpiece.

When one of the first and second guide surfaces engages the corresponding first or second edges of the workpiece, the guide member does not cause the saw blade to bind on the workpiece as the saw blade cuts the workpiece. Preferably, the first and second guide surfaces do not extend along any portion of the lateral face of the saw blade, do not extend rearwardly beyond the forward-most cutting portion of the saw blade, and do not extend rearwardly beyond the forward edge of the shoe plate. This prevents the cut portion of the workpiece from becoming wedged between the saw blade and the rip guide during cutting.

An advantage of the rip guide of the present invention is that, in the working position, the rip guide does not cause the saw blade to bind on the workpiece as the saw blade cuts the workpiece.

Another advantage of the present rip guide is that, because the guide surfaces do not extend along any portion of the lateral face of the saw blade and do not extend rearwardly beyond the forward-most cutting teeth of the saw blade, the guide does not obscure the operator's vision of the saw blade as the saw blade cuts the workpiece.

Yet another advantage of the present rip guide is that, when the rip guide is in the stored position, the rip guide does not obscure the operator's vision of the saw blade as the saw blade cuts the workpiece and does not substantially extend beyond the continuous periphery of the shoe plate.

A further advantage of the present rip guide is that, because the rip guide includes an arm and a guide member extending from the housing and over the forward portion of the shoe plate in the cutting direction, rather than over the side of the shoe plate, the guide member and the guide surfaces can be located at substantially all positions between the sides of the shoe plate. There is no "dead zone" in which the second guide surface cannot be used, and there is only a minimal "dead zone" (less than the thickness of dimensional lumber, e.g. less than ¾ of an inch) in which the first guide surface cannot be used.

Another advantage of the present rip guide is that, because the guide surfaces do not extend along any portion of the saw blade, the guide surfaces can be positioned very close to the path of the saw blade, as is required to cut or shave a narrow portion from the workpiece.

Yet another advantage of the present rip guide is that, because the rip guide does not extend off the lateral portion of the shoe plate of the circular saw, the rip guide does not make the circular saw unwieldy or unbalanced.

A further advantage of the present rip guide is that, when the rip guide is mounted on the circular saw, the rip guide does not hinder removal of the saw blade.

Other features and advantages of the invention will become apparent to those skilled in the art upon review of the following detailed description, claims and drawings.

Figure 1:
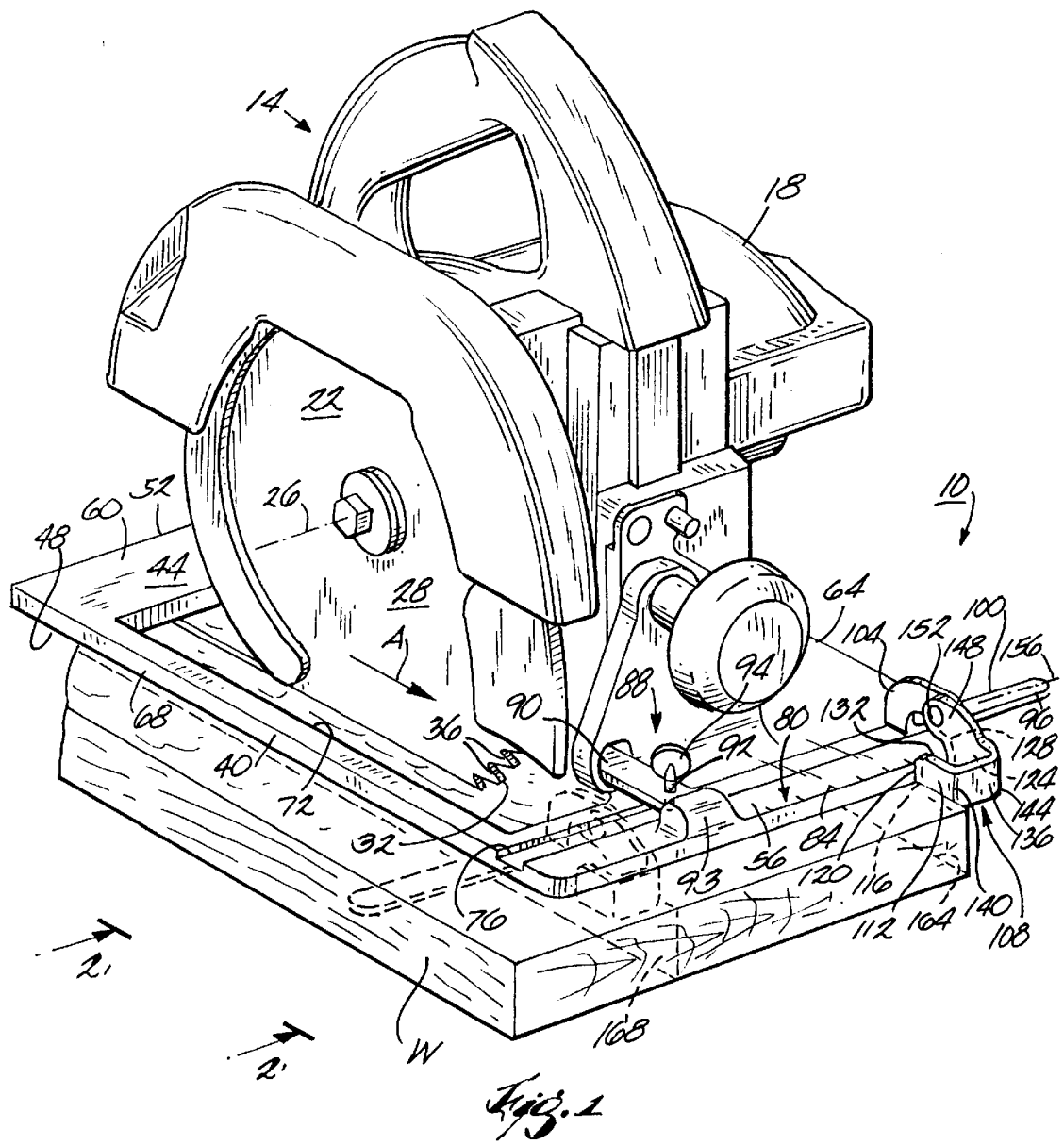
FIG. 1 is a perspective view of a circular saw having a rip guide embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

A rip guide 10 embodying the invention is illustrated in FIG. 1. As shown in FIG. 1, the rip guide 10 is used with a cutting tool, such as a circular saw 14.

The circular saw 14 includes a housing 18 and a motor (not shown) supported by the housing 18. The circular saw 14 further includes a cutting blade, such as a circular saw blade 22. The saw blade 22 is rotatably driven by the motor about an axis 26 and is operable to cut a workpiece W in a forward cutting direction (indicated by arrow A). The saw blade 22 includes oppositely facing lateral faces or sides 28 (only one shown). As shown in FIG. 1, the circular saw blade 22 also includes a periphery 32 having a plurality of cutting teeth 36.

The housing 18 includes a support plate or a shoe plate 40. The shoe plate 40 supports the circular saw 14 on the workpiece W. The shoe plate 40 has an upper surface 44, a lower surface 48 (for engaging the workpiece W), and a continuous periphery 52 extending between the upper surface 44 and the lower surface 48. The continuous periphery 52 includes a forward portion 56, a rearward portion 60 and lateral side portions 64 and 68. The lateral side portions 64 and 68 define therebetween the width of the shoe plate 40. The shoe plate 40 has therein an aperture 72. A portion of the saw blade 22 extends through the aperture 72 to cut the workpiece W. The shoe plate 40 also defines a recess or groove 76 formed in the upper surface 44 near the forward portion 56 of the shoe plate 40.

As shown in FIG. 1, the circular saw 14 is a drop shoe circular saw, i.e. the shoe plate 40 is adjustable relative to the saw blade 22 so that the depth of cut of the saw blade 22 is adjustable between a minimum and maximum depth of cut. In addition, as shown in FIG. 1, the circular saw 14 is also a pivot shoe circular saw, i.e. the shoe plate 40 is pivotally adjustable relative to the saw blade 22 so that the circular saw blade 22 is adjustable to a bevel angle relative to the shoe plate 40. It should be understood, however, that the present invention is also applicable to other types of circular saws such as rear pivot or front pivot circular saws.

An indicator 80 is formed on the upper surface 44 of the shoe plate 40 adjacent to and parallel to the forward portion 56 of the shoe plate 40. Generally, the indicator 80 indicates a lateral position of the rip guide 10 relative to the saw blade 22 and, in the illustrated construction, includes markings 84 in one-eighth inch increments.

The circular saw 14 also includes a locking apparatus 88. In the illustrated construction, the locking apparatus 88 includes an elongated member 90 having therein a threaded aperture 92 and connected to a mount 93 on the shoe plate 40. The locking apparatus 88 also includes a threaded fastener 94 mounted in the aperture 92.

The rip guide 10 includes a support member 96 supported on the shoe plate 40. The support member 96 includes a generally elongated, straight sliding member 100. The sliding member 100 is slidably supported in the groove 76 formed in the shoe plate 40 for movement laterally relative to the shoe plate 40.

The rip guide 10 also includes a support arm 104 fixed to the sliding member 100 of the support member 96. The support arm 104 extends forwardly from the sliding member 100 in the cutting direction A. The support arm 104 also extends forwardly in the cutting direction A from the housing 18 and from the shoe plate 40.

The rip guide 10 also includes a guide member 108 pivotally connected to the support member 96. The guide member 108 includes a first guide surface 112. The guide member 108 also includes a first rear surface 116. The first guide surface 112 and the first rear surface 116 define a first guide surface edge 120 therebetween.

The guide member 108 also includes a second guide surface 124 spaced from and facing opposite to the first guide surface 112. The guide member 108 also includes a second rear surface 128. The second guide surface 124 and the second rear surface 128 define a second guide surface edge 132 therebetween.

When the rip guide 10 is supported by the shoe plate 40, the first and second guide surfaces 112 and 124 are generally parallel to the lateral side portions 64 and 68 of the shoe plate 40. Also, when the shoe plate 40 is oriented in the non-beveled, horizontal position perpendicular to the vertical saw blade 22, the first and second guide surfaces 112 and 124 are generally parallel to a vertical plane defined by the saw blade 22.

Figure 3:
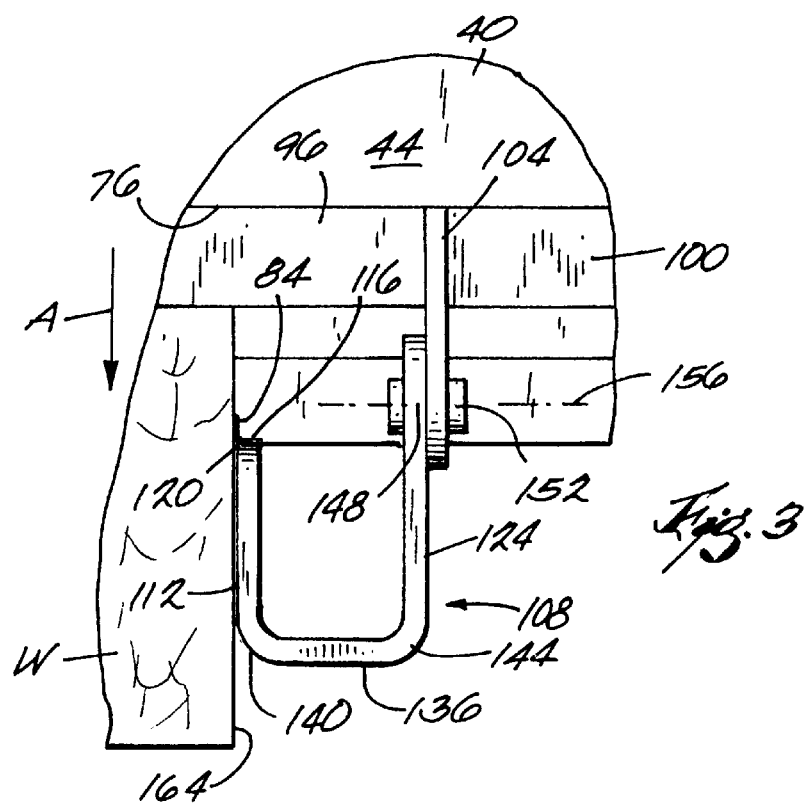
FIG. 3 is an enlarged top view of the rip guide shown in FIG. 1 with portions cut away.

The guide member 108 also includes connecting member 136 between the first guide surface 112 and the second guide surface 124. As best shown in FIG. 3, the guide member 108 is substantially U-shaped. The connecting member 136 is connected at one end to the first guide surface 112 and defines a first smooth, curved or arcuate edge 140 therebetween. At the other end, the connecting member 136 is connected to the second guide surface 124 and defines a second smooth, curved or arcuate edge 144 therebetween.

The rip guide 10 also includes a guide member arm 148 extending from the second guide surface 124. In addition, the rip guide 10 includes a pivot member 152 pivotally connecting the support arm 104 and the support member 96 to the guide member arm 148 so that the guide member arm 148 also extends from the housing 18 and from the shoe plate 40 in the cutting direction A. The pivot member 152 connects the guide member 108 to the support member 96, and the guide member 108 is pivotable relative to the support member 96 about a pivot axis 156. In the illustrated construction, the pivot member 152 is a rivet member so that the guide member 108 is freely and readily pivotable relative to the support member 96. In other embodiments, however, the rip guide 10 may include a member such as a detent that is engageable to lock the guide member 108 in a given position relative to the support member 96.

The rip guide 10 also includes an indicator member which cooperates with the indicator 80 formed on the shoe plate 40 to indicate the lateral position of the first and second guide surfaces 112 and 124 relative to the saw blade 22. In the illustrated construction, one indicator member is formed integrally with each of the first and second guide surfaces 112 and 124. On the first guide surface 112, the indicator member is the first rear edge 120. On the second guide surface 124, the indicator member is the second rear edge 132.

Figure 2:
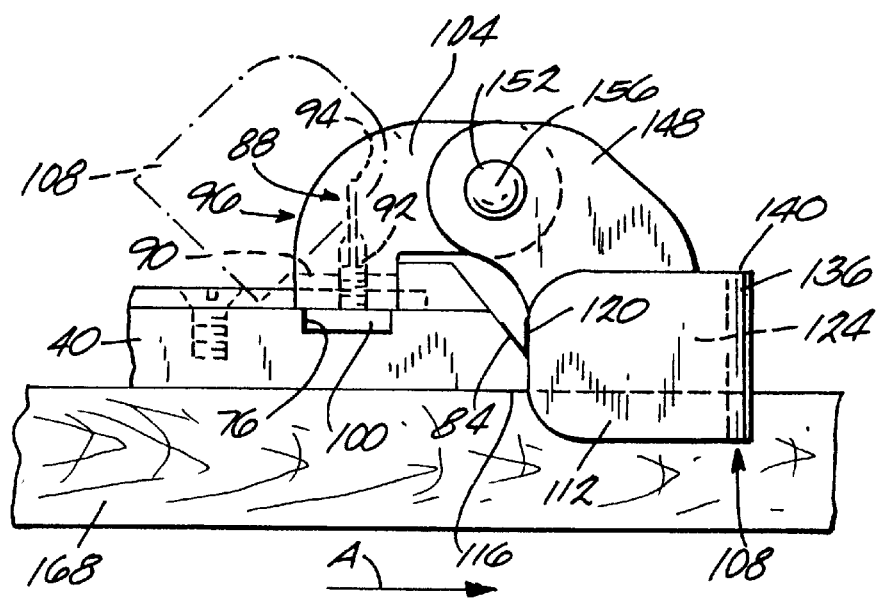
FIG. 2 is an enlarged side view taken generally along line 2—2 in FIG. 1.

The guide member 108 is freely pivotable between a working position (shown in FIG. 1 and shown in solid lines in FIG. 2) and a stored position (shown in phantom lines in FIG. 2). In the working position, the guide member 108 is selectively positioned, as shown in FIG. 1, with the first guide surface 112 engaging a first edge 164 of the workpiece W or, as shown in FIG. 2, with the second guide surface 124 engaging a second edge 168 of the workpiece W so that the circular saw 14 is guided in the cutting direction A on a path that is generally parallel to the first or second edge 164 or 168 of the workpiece W. When the rip guide is in the working position, the guide member arm 148 is positioned so that the guide member arm 148 extends over and forwardly beyond the forward portion 56 of the shoe plate 40.

Also, when the rip guide 10 is in the working position shown in FIG. 1, the first rear surface 116 and the second rear surface 128 engage the forward portion 56 of the shoe plate 40. Generally, the weight of the guide member 108 holds the guide member 108 in the working position. Also, as the circular saw 14 is moved in the cutting direction A across the workpiece W in the direction of cutting, movement of the first or second guide surface 112 or 124 against the corresponding edge 164 or 168 of the workpiece applies a rearward force (relative to the cutting direction A) to the guide member 108 so that the guide member 108 is maintained in the working position.

Also, the first smooth, curved edge 140 ensures that, when the first guide surface 112 engages the edge 164 of the workpiece W and the circular saw 14 is moved in the cutting direction A, the guide member 108 will not catch on the edge 164 and will not damage the edge 164. Similarly, the second smooth, curved surface 144 ensures that, when the second guide surface 124 engages the second edge 168 of the workpiece W, the guide member 108 will not catch of the edge 168 and will not damage the edge 168.

In the stored position (shown in phantom lines in FIG. 2), the guide member 108 is positioned so that a substantial portion of the rip guide 10 does not extend beyond the continuous periphery 52 or beyond forward portion 56 and lateral side portions 64 and 68 of the shoe plate 40. Further, in the stored position, the rip guide 10 does not obstruct operation of the circular saw 14 and is out of the way of engaging with the workpiece W. In addition, in the stored position, the rip guide 10 does not obscure the operator's vision of the saw blade 22 as the saw blade 22 cuts the workpiece W.

As shown in FIG. 1, the rip guide 10 is selectively adjustable to a first guide position, in which the first guide surface 112 is engageable with the first edge 164 of the workpiece on the side of the saw blade 22 toward the lateral face 28. As shown in phantom lines in FIG. 1, the rip guide 10 is also adjustable to a second guide position, in which the second guide surface 124 is engageable with the second edge 168 of the workpiece W on the opposite side of the saw blade toward the other lateral face (not shown).

Further, as shown in FIG. 1, the rip guide 10 is selectively adjustable so that the first and second guide surfaces 112 and 124 are laterally positionable relative to the saw blade 22 in a plurality of lateral positions relative to the saw blade 22. The rip guide is shown in a first lateral position (shown in solid lines in FIG. 1), in which the first and second guide surfaces 112 and 124 are a first lateral distance from the saw blade, and in a second lateral position (shown in phantom lines in FIG. 1), in which the first and second guide surfaces are a second lateral distance from the saw blade 22.

Also, because the support arm 104 and the guide member arm 148 extend from the housing 18 and the shoe plate 40 so that the guide member 108 is supported forwardly beyond the forward portion 56 of the shoe plate 40, the rip guide 10 is laterally adjustable so that the rip guide 10 is selectively positionable in substantially any lateral position relative to the width of the shoe plate 40. In other words, the first and second guide surfaces 112 and 124 can be positioned in substantially any lateral position relative to the width of the shoe plate 40. "[P]ositionable in substantially any lateral position relative to the width of the shoe plate 40" means that there is only a minimal "dead zone" (less than the thickness of dimensional lumber, e.g., less than ¾ of an inch) for the rip guide 10.

Specifically, for the second guide surface 124, there is no "dead zone". This is important because approximately 90% of rip cutting operations are done with the second guide surface 124 engaging the second edge 168 of the workpiece W so that the shoe plate 40 and a substantial part of the weight of the circular saw 14 rests on the workpiece W. For the first guide surface 112, there is only a minimal "dead zone" (less than the thickness of dimensional lumber, e.g., less than ¾ of an inch). The "dead zone" for the first guide surface 112 is the zone between the saw blade 22 and the first guide surface 112 when the support arm 104 engages the elongated member 90 of the locking apparatus 88.

Further, because the guide member 108 includes the connecting member 136 between the first and second guide surfaces 112 and 124, the rip guide 10 can be laterally positioned without obstruction by the mount 93 on the shoe plate 40. The rip guide 10 is positionable so that the first guide surface 112 can be positioned on either side of the mount 93 or at any position between the opposite sides of the mount 93.

The threaded fastener 94 is engageable with the sliding member 100 to prevent the support member 96 and the rip guide 10 from sliding relative to the shoe plate 40. In the illustrated construction, the threaded fastener 94 applies a downward force against the upper surface of the sliding member 100 to hold the rip guide 10 in a fixed lateral position relative to the shoe plate 40 and relative to the saw blade 22.

To adjust the lateral position of the rip guide 10, the threaded fastener 94 is loosened so that the threaded fastener 94 does not apply pressure to the upper surface of the sliding member 100. The sliding member 100 is then slidably moved in the groove 76 so that the guide member 108 and the first and second guide surfaces 112 and 124 are in the desired lateral position relative to the saw blade 22. Once the rip guide 10 is in the desired lateral position, the threaded fastener 94 is tightened to engage the upper surface of the sliding member 100 and applies a force to hold the rip guide 10 in the selected lateral position.

The lateral position of the rip guide 10 is indicated by cooperation of the indicator 80 and the indicator members formed on the first and second guide surfaces 112 and 124. As shown in solid lines in FIG. 1, when the first guide surface 112 engages the first edge 164 of the workpiece W, the rear edge 120 of the first guide surface 112 engages the forward portion 56 of the shoe plate 40. The rear edge 120 is aligned with a portion of the indicator 80 to indicate the lateral position of the first guide surface 112 relative to the saw blade 22.

As shown in phantom lines in FIG. 1 and as shown in solid lines in FIG. 2, when the second guide surface 124 engages the second edge 168 of the workpiece W, the rear edge 132 of the second guide surface 124 engages the forward portion 56 of the shoe plate 40. The rear edge 132 of the second guide surface 124 is aligned with a portion of the indicator 80 to indicate the lateral position of the second guide surface 124 relative to the saw blade 22.

As shown in FIG. 1, the first and second guide surfaces 112 and 124 are spaced from the saw blade 22 in the cutting direction A. This position of the first and second guide surfaces 112 and 124 relative to the saw blade 22 ensures that the rip guide 10 does not substantially cause the saw blade 22 to bind on the workpiece W as the saw blade 22 cuts the workpiece W. In addition, the position of the first and second guide surfaces 112 and 124 relative to the saw blade 22 ensures that the rip guide 10 does not obscure the operator's vision of the saw blade 22 as the saw blade 22 cuts the workpiece W.

Further, because the first and second guide surfaces 112 and 124 are spaced from the saw blade in the cutting direction A, the rip guide 10 can be positioned with one of the guide surfaces 112 and 124 positioned very close (e.g. within ⅛ inch) on either side of the cutting path of the saw blade 22. A very narrow portion of the workpiece W may thus be cut by the saw blade 22 while the rip guide 10 guides the circular saw 14 relative to the edge of the workpiece W.

As shown in FIGS. 1 and 2, when the guide member 108 is in the working position, the first and second guide surfaces 112 and 124 do not extend along any portion of the lateral face 28 or the other lateral face (not shown) of the saw blade 22, do not extend rearwardly beyond the forward-most cutting teeth 36 of the saw blade 22, and do not extend rearwardly beyond the forward portion 56 of the shoe plate 40. In other constructions, however, the first and second guide surfaces 112 and 124 may extend rearwardly beyond the forward portion 56 of the shoe plate 40 so long as the rip guide 10 does not substantially cause the saw blade 22 to bind on the workpiece W and so long the rip guide 10 does not obscure the operator's vision of the saw blade 22.

Various features of the invention are set forth in the following claims.

I claim:

1. A cutting tool for cutting a workpiece having an edge in a cutting direction that is generally parallel to the edge, said tool comprising:
    a housing including a support plate for supporting said tool on the workpiece;
    a motor supported by said housing;
    a cutting blade driven by said motor to cut the workpiece; and
    a guide for guiding said tool relative to the edge of the workpiece, said guide including a support member supported on said housing,
    an arm supported by said support member and extending from said housing in the cutting direction, and
    a guide member supported by said arm so that said guide member is connected to said support member, said guide member having a first guide surface extending from said arm in the cutting direction, said first guide surface being engageable with a first edge of the workpiece to guide said cutting tool in the cutting direction relative to the workpiece.

2. The cutting tool as set forth in claim 1 wherein said guide member includes a second guide surface spaced from and facing opposite to said first guide surface, said second guide surface extending from said arm in the cutting direction, and said second guide surface being engageable with a second edge of the workpiece to guide said cutting tool in the cutting direction relative to the workpiece.

3. The cutting tool as set forth in claim 2 wherein said cutting blade is a saw blade having opposite sides, and wherein said guide is selectively laterally adjustable relative to said saw blade between a first guide position, in which said first guide surface is engageable with the first edge of the workpiece on one side of said saw blade, and a second guide position, in which said second guide surface is engageable with the second edge of the workpiece on the other side of said saw blade.

4. The cutting tool as set forth in claim 2 wherein said guide member includes a connecting member connected between said first guide surface and said second guide surface.

5. The cutting tool as set forth in claim 4 wherein said support plate includes a mount for supporting said support member on said housing, said mount having opposite lateral sides defining therebetween a width of said mount, wherein said guide is selectively laterally adjustable relative to said support plate, and wherein said connecting member is configured so that, when said guide is adjusted, said first guide surface is positionable at substantially any lateral position between said opposite lateral sides of said mount.

6. The cutting tool as set forth in claim 1 wherein said support plate includes first and second lateral side portions defining therebetween a width of said support plate, and wherein said guide is laterally adjustable so that said guide is selectively positionable in substantially any lateral position relative to said width of said support plate.

7. The cutting tool as set forth in claim 1 wherein said support plate has an upper surface, a lower surface, and a continuous periphery between said upper surface and said lower surface, wherein said continuous periphery has a forward portion, a rearward portion, and lateral side portions, and wherein said guide is supported by said support plate adjacent said forward portion.

8. The cutting tool as set forth in claim 7 wherein said arm is positionable to extend over said forward portion of said support plate.

9. The cutting tool as set forth in claim 1 wherein said guide member is pivotally connected to said support member for movement between a working position, in which said first guide surface is engageable with the first edge of the workpiece, and a stored position, in which said first guide surface is not engageable with the first edge of the workpiece.

10. The cutting tool as set forth in claim 9 wherein said support plate has an upper surface, a lower surface, and a continuous periphery between said upper surface and said lower surface, and wherein, when said guide member is in said stored position, a substantial portion of said guide does not extend beyond said continuous periphery of said support plate.

11. The cutting tool as set forth in claim 9 wherein said guide includes a pivot member connecting said guide member and said support member so that said guide member is readily and freely movable between said working position and said stored position.

12. A guide for a circular saw, the circular saw including a housing, the housing including a shoe plate for supporting the circular saw on a workpiece having an edge, a motor supported by the housing, and a saw blade rotatably driven by the motor about an axis, the saw blade being operable to cut the workpiece in a cutting direction that is generally parallel to the edge, said guide comprising:
a support member adapted to be supported on the housing;
an arm supported by said support member and extending from the housing in the cutting direction; and
a guide member supported by said arm so that said guide member is pivotally connected to said support member, wherein, when said support member is supported on the housing, said guide member extends from the housing in the cutting direction, said guide member including a first guide surface for guiding the circular saw in the cutting direction relative to a first edge of the workpiece.

13. The guide as set forth in claim 12 wherein said guide member includes a second guide surface spaced apart from and facing opposite said first guide surface, said second guide surface being engageable with a second edge of the workpiece to guide the circular saw in the cutting direction relative to the workpiece.

14. The guide as set forth in claim 13 wherein said guide member includes a connecting member connected between said first guide surface and said second guide surface.

15. The guide as set forth in claim 13 wherein said guide member is substantially U-shaped.

16. The guide as set forth in claim 13 wherein the saw blade has opposite sides, and wherein said guide is selectively laterally adjustable relative to the saw blade between a first guide position, in which said first guide surface is engageable with the first edge of the workpiece on one side of the saw blade, and a second guide position, in which said second guide surface is engageable with the second edge of the workpiece on the other side of the saw blade.

17. The guide as set forth in claim 12 wherein the shoe plate has an upper surface, a lower surface, and a continuous periphery between the upper surface and the lower surface, wherein the continuous periphery has a forward portion, a rearward portion, and lateral side portions, and wherein said guide is supported by the shoe support plate adjacent the forward portion.

18. The guide as set forth in claim 17 wherein said arm is positionable to extend over the forward portion of the shoe plate.

19. The guide as set forth in claim 12 wherein said guide member is pivotally connected to said support member for movement between a working position, in which said first guide surface is engageable with the edge of the workpiece, and a stored position, in which said first guide surface is not engageable with the edge of the workpiece.

20. The guide as set forth in claim 19 wherein the shoe plate has an upper surface, a lower surface, and a continuous periphery between the upper surface and the lower surface, and wherein, when said guide member is in said stored position, a substantial portion of said guide does not extend beyond the continuous periphery of the shoe plate.

21. The guide as set forth in claim 19 wherein said guide includes a pivot member connecting said guide member and said support member so that said guide member is readily and freely movable between said working position and said stored position.

22. A circular saw comprising:
a housing;
a shoe plate supported by the housing, said shoe plate having an upper surface and a lower surface for supporting said saw on a workpiece having an edge, said shoe plate defining a continuous periphery between said upper surface and said lower surface, said continuous periphery having a forward portion, a rearward portion, and lateral side portions, said shoe plate defining a recess in said upper surface adjacent said forward portion, said shoe plate defining therein an aperture;
a motor supported by said housing;
a saw blade rotatably driven by said motor about an axis, a portion of said saw blade being extendable through said aperture to cut the workpiece in a cutting direction generally parallel to the edge of the workpiece, said saw blade having opposite sides; and
a guide for selectively guiding said circular saw in the cutting direction relative to a first edge and a second edge of the workpiece, said guide including
a support member supported by said shoe plate adjacent said forward portion, said support member including
a sliding member slidably supported in said recess, and
a support arm supported by said sliding member and extending from said shoe plate in the cutting direction, and
a guide member pivotally connected to said support member, said guide member including
a guide member arm pivotally connected to said support arm, said guide member arm extending from said shoe plate in the cutting direction,
a first guide surface supported by said guide member arm and extending in the cutting direction, said first guide surface being substantially parallel to one of said lateral side portions, said first guide surface being engageable with the first edge of the workpiece,
a second guide surface supported by said guide member arm, said second guide surface spaced from and facing opposite to said first guide surface, said second guide surface extending in the cutting direction, said second guide surface being substantially parallel to one of said lateral side portions, said second guide surface being engageable with the second edge of the workpiece,
a connecting member connected between said first guide surface and said second guide surface, said connecting member defining a first smooth, curved surface and a second smooth, curved surface, and
a pivot member pivotally connecting said guide member to said support member so that said guide member is pivotable between a working position, in which one of said first guide surface and said second guide surface is engageable with a corresponding one of the first edge and the second edge of the workpiece, and a stored position, in which a substantial portion of said guide does not extend beyond said continuous periphery, said pivot member being between said support arm and said guide member arm;
wherein said guide is selectively laterally adjustable relative to said saw blade between a first guide position, in which said first guide surface is engageable with the first edge of the workpiece on one side of said saw blade, and a second guide position, in which said second guide surface is engageable with the second edge of the workpiece on the other side of said saw blade, and wherein said guide is laterally adjustable relative to said saw blade between a first lateral position, in which said first guide surface is spaced a first distance laterally from said saw blade, and a second lateral position, in which said first guide surface is spaced a second distance laterally from said saw blade.

* * * * *